INVENTOR.
ROBERT L. CHICKERING
ALFRED M. CHICKERING
BY

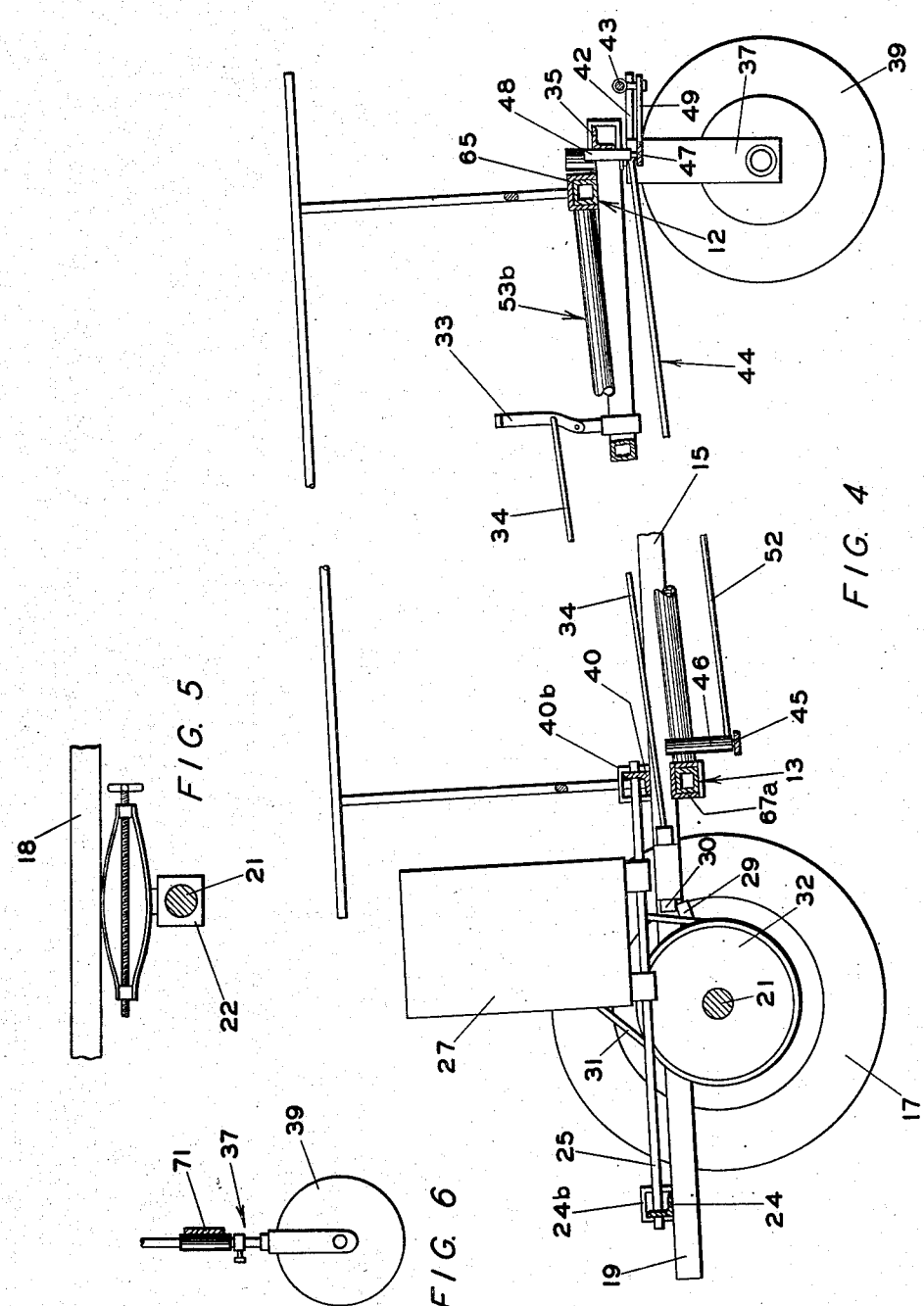

Patented Aug. 8, 1950

2,518,418

UNITED STATES PATENT OFFICE 2,518,418

POWERED VEHICLE ACCOMMODATING WORKERS IN PRONE POSITION

Robert L. Chickering and Alfred M. Chickering, Belding, Mich., assignors to Chickering Vegetable Equipment Co., Inc., Belding, Mich., a corporation of Michigan Application October 9, 1948, Serial No. 53,612

4 Claims. (Cl. 180—1)

This invention relates in general to a vehicle for transporting workers and more particularly to an improved, self-propelled type thereof for carrying a plurality of workers in prone position, the movement and direction of said vehicle being controllable by one of said prone workers.

The presently known self-propelled vehicles for transporting a plurality of workers in the prone position, for a purpose such as planting onions, require one person to steer the vehicle and operate its propelling unit, which person is not able to do any other work. During periods when manpower is scarce or high priced, this extra worker becomes costly.

Accordingly, a primary object of this invention is to provide an improved, self-propelled vehicle for transporting a plurality of workers in the prone position, which workers are all participating in productive operations.

A further object of this invention is to provide a vehicle as aforesaid which is steerable, and whose movement is controllable, by one of the prone workers.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, we have provided a four wheeled vehicle having forward and rearward ends and having a flat, rectangular frame supported upon and substantially between two front and two rear wheels. A plurality of stretcher-like personnel supports, hereinafter called "stretchers," are suspended between the forward and rearward elements of said frame for carrying workers in the prone position. A power unit, which is supported between and drives said rear wheels, is controllable by one of the prone workers. Said front wheels are steerable by the same worker. Suitable supports are secured to and extend upwardly from said frame for supporting a canopy.

For illustration of a preferred embodiment of my invention, attention is directed to the accompanying drawings in which:

Figure 4 is a broken, sectional view taken along the line IV—IV of Figure 1.

Figure 5 illustrates one means of mounting the rear axle for vertical adjustment.

Figure 6 illustrates one means of mounting the forks of the front wheels for vertical adjustment.

Figure 1:
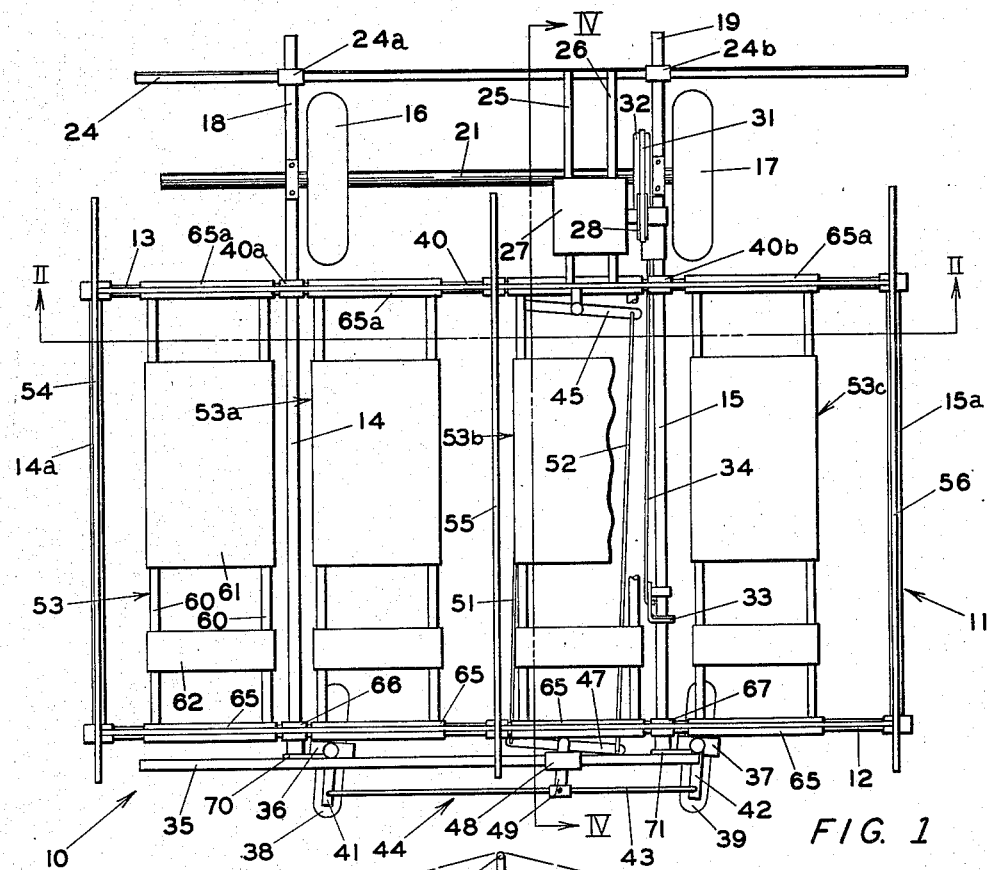
Figure 1 is a top plan view of the vehicle to which this invention relates.

It will be clearly understood that the words "front" or "forward," and "rear" or "rearward," which refer to the direction of normal operation of the vehicle, are used herein for illustrative purposes, only, and are not intended to impose limitations upon the scope of the invention.

The labor transporting vehicle 10, shown in the drawings, is comprised of a rectangular frame 11 having forward and rearward, horizontal, transverse frame elements 12 and 13, which elements are preferably substantially parallel to each other and perpendicular to the longitudinal axis of the vehicle 10. The forward frame element 12 is secured on top of the forward ends of a pair of spaced, preferably parallel, longitudinal, metal chassis members 14 and 15, which members also pass over, are secured to, and extend rearwardly beyond the rearward frame element 13. The forward ends of said chassis members are preferably positioned slightly higher than the rearward ends thereof. Thus, the rearward frame element 13 is somewhat lower than the forward frame element 12. Further parallel, longitudinal frame members 14a and 15a connect the outer ends of the transverse elements 12 and 13.

The rearwardly extending ends 18 and 19 of the chassis members 14 and 15 are supported upon a pair of driving wheels 16 and 17 which are positioned rearwardly of the rearward frame element 13 and adjacent to said chassis member's extended ends. The wheels 16 and 17 are secured to and rotatable with the rear shaft 21 which is rotatably supported within the bearings 22 and 23 which are secured to the chassis member extended ends 18 and 19, respectively, in any conventional manner. A rear cross bar 24, which is preferably parallel with the rearward frame element 13 and spaced rearwardly therefrom, is secured to the chassis member's extended ends 18 and 19 near the rearward extremities thereof. An intermediate cross bar 40 lies across the chassis member 14 and 15 directly above the rearward frame element 13.

A pair of slide rods 25 and 26, which are secured to and extend between the cross bar 24 and the intermediate cross bar 40, are substantially perpendicular thereto and lie between the chassis members 14 and 15, preferably adjacent to the chassis member 15. A power unit 27, which may be a gasoline engine of any appropriate size and type, is longitudinally adjustably supported upon the slide rods 25 and 26.

A variable pitch driving pulley 28 which is rotatably supported upon and driven by the power unit 27, is operably engaged by a pulley belt 31 which also engages and drives the driven pulley 32. The said driven pulley 32 is secured to and rotatable with the rear wheel shaft 21. Said pulley 32 may be secured directly to said shaft or, preferably, it may be secured thereto through any conventional speed reduction mechanism.

A clutch lever 33, which is pivotally secured to the chassis member 15 near the forward end thereof, is operably connected to any suitable, conventional clutch mechanism, not shown, by means of the clutch rod 34. Said clutch may, as desired, be associated with the output shaft of the power unit or it may be incorporated into the speed reduction gear mechanism associated with the driven pulley 32. In the specific construction here shown the speed reduction mechanism comprises a standard planetary gear arrangement wherein the frame holding the planetary gears has a revolvable arm external of the casing surrounding the mechanism. The end of this arm appears at 29 in Figure 4. A block 30 is slidingly supported on the longitudinal frame member 15 and is movable forwardly and rearwardly by the clutch rod 34. Upon rearward movement of the clutch rod 34, the block 30 is moved into the path of revolution of the arm 29. Thus the revolution of the planetary gears in the speed reduction unit is stopped and the axle 21 caused to rotate. Incidentally, since this planetary arrangement here functions to connect and disconnect the transmission of power from the power unit 27 to the shaft 21, it, together with conventional friction devices, is to be understood as included by the general word "clutch" in the specification and claims herein. Thus, the power unit 27 can be caused to actuate or cease actuating the driving wheels 16 and 17 when the said power unit is running, by appropriate operation of the clutch lever 33.

A front cross bar 35 (Figure 1) is supported upon, spaced forwardly from, and substantially parallel with the forward frame element 12, and intersects the longitudinal axes of the chassis members 14 and 15. A pair of turning forks 36 and 37, which rotatably support the front or steering wheels 38 and 39, are supported for pivotal movement about a vertical axis upon the front cross bar 35, said turning forks being respectively adjacent to the forward end of each chassis member 14 and 15 and in alignment with the rear wheels 16 and 17. A pair of turning tongues 41 and 42, which are rigidly secured to the turning forks 36 and 37, respectively, extend forwardly therefrom and are mutually engaged near their forward extremities by the opposite extremities of the tie rod 43.

A steering mechanism 44 (Figures 1 and 4) is comprised of a rear steering bar 45, which is pivotally supported intermediate its extremities upon a rear bracket 46 for substantially horizontal movement. Said bracket is adjustably supported upon the rearward frame element 13, preferably between the chassis members 14 and 15. A front steering bar 47 is pivotally supported intermediate its extremities for movement in a substantially horizontal plane upon the front bracket 48, which bracket is adjustably supported upon the front cross bar 35 preferably between the chassis members 14 and 15 and substantially longitudinally aligned with said rear bracket 46. A steering arm 49, which is secured to, and substantially perpendicular to, the front steering bar 47, extends forwardly therefrom and is adjustably secured to the tie rod 43 intermediate its extremities. The corresponding ends of the front and rear steering bars 47 and 45, respectively, are mutually engaged by a pair of steering rods 51 and 52, respectively.

Accordingly, a pivotal movement of the rear steering bar 45 is translated into a turning movement of the front wheels 38 and 39 through the steering rods 51 and 52, the front steering bar 47, the steering arm 49, the transverse tie rod 43, the turning tongues 41 and 42, and the turning forks 36 and 37.

A plurality of stretchers (Figure 1), herein shown as 4 in number and indicated by the numerals 53, 53a, 53b and 53c, are removably supported upon, and extend longitudinally between, the forward and rearward frame elements 12 and 13. These stretchers are made in any convenient manner, but will be satisfactory if each is comprised of a pair of parallel, longitudinally arranged rods 60 between which are stretched a body supporting canvas 61 and a head supporting canvas 62. Each stretcher is designed to support one worker in the prone position. In this particular embodiment of the invention, the stretcher 53b is positioned substantially directly over the steering mechanism 44 so that a worker supported upon the stretcher 53b in the prone position can easily and effectively engage the rear steering bar 45 with his feet. Since the stretcher 53b is directly adjacent to the chassis member 15 upon which the clutch lever 33 is mounted, the worker supported by the stretcher 53b can also operate said clutch lever as well as steer the vehicle.

Figure 2:
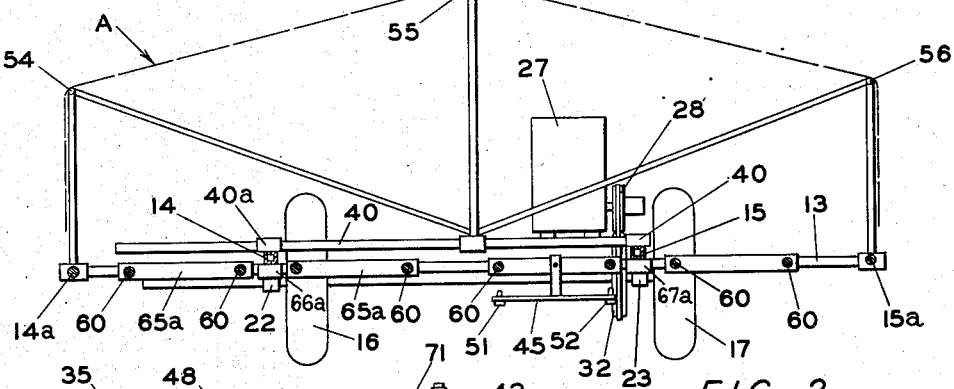
Figure 2 is a sectional view taken along the line II—II of Figure 1.
Figure 3:
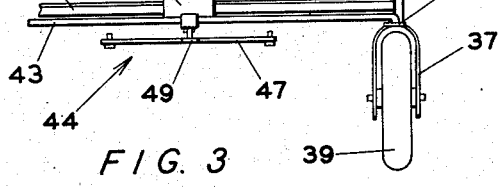
Figure 3 is a fragmentary front elevation view of the vehicle shown in Figure 1.

An appropriate superstructure (Figures 2 and 4), including the three horizontal, parallel ridge poles 54, 55 and 56 may be secured to and supported upon the rectangular frame 11 and/or the chassis members 14 and 15 for the purpose of supporting a suitable canopy A.

Before operating the transporting vehicle to which this invention relates, an appropriate speed adjustment is made to suit the type of crop being worked, the land being covered or the workers being used, by moving the power unit 27 forwardly or rearwardly along the slide rods 25 and 26. The variable pitch driving pulley 28 accommodates itself to such movement of the power unit 27 in a conventional manner, thereby effecting a desired determination of the speed of the vehicle's movement. The power unit 27 is energized and the vehicle 10 is ready for movement upon proper actuation of the clutch lever 33. The worker reclining on the stretcher 53b actuates the clutch lever 33 and the vehicle 10 is thereby caused to move forwardly at a steady speed. Said worker on said stretcher 53b then steers the vehicle along the field with his feet while he processes the ground or crops beneath him in the same manner as the workers reclining on the stretchers 53, 53a and 53c. Thus, it will be recognized that all occupants of the vehicle 10 may contribute productively and no extra man is required to operate the vehicle.

Although not essential to the broad concept of the invention, the machine as described and illustrated lends itself readily to the laterally adjustable construction illustrated. It will be appreciated that this adjustability to fit differing row widths will greatly extend the usefulness of a given machine.

Each of the stretcher members 60 and the chassis members 14 and 15 are fastened to the transverse members 12 and 13 by first being secured to anchor members 65, 66 and 67, respectively, at their forward ends and to anchor members 65a, 66a and 67a at their rearward ends, which anchor members encircle the transverse members 12 and 13, are slidable therealong and detachably fastenable thereto. The front cross bar is detachably fastened, as by bolting, to the plates 70 and 71 of the fork assemblies 36 and 37, respectively. The intermediate cross bar 40 and the rear cross bar 24 are slidably received into the anchor members 40a and 40b, and 24a and 24b, respectively, which anchor members are welded, or otherwise rigidly fastened, to the respective chassis members 14 and 15 as shown. The bearing 22 is adjustably slidable along the shaft 21.

Further, as illustrated in Figures 5 and 6, the front and rear wheels may by this construction be readily mounted for vertical adjustment if desired.

Although the above mentioned drawings and description apply to one particular preferred embodiment of the invention, it is not our intention, implied or otherwise, to eliminate other variations or modifications which do not depart from the scope of the invention unless specifically stated to the contrary in the hereinafter appended claims.

We claim:

1. In a vehicle, having a forward end and a rearward end, for accommodating workers in the prone position, the combination comprising: a pair of spaced, parallel, longitudinal chassis members sloping downwardly toward their rearward ends; a flat, rectangular frame having forward and rearward, parallel, transverse elements perpendicular to and crossing said chassis members, said chassis members being secured at their forward ends upon said forward element for adjustment therealong, said chassis members being secured intermediate their extremities above said rearward element for adjustment therealong, and said chassis members extending rearwardly of said rearward element; a pair of driving wheels rotatably mounted upon the rearwardly extending ends of said chassis members; a power unit supported upon said extending ends; transmission means, including clutch means, operably connecting said power unit with said driving wheels; a clutch actuating lever pivotally supported upon one chassis member near its forward end and linkage connecting said lever to said clutch; a pair of steerable wheels pivotally secured to the forward ends of said chassis members; a front steering bar horizontally pivotally supported upon and between the forward ends of the chassis members and linkage operably connecting said forward steering bar to said steerable wheels; a rear steering bar horizontally pivotally supported upon said rearward element between said chassis members and adjacent to said one chassis member; a pair of steering rods operably connecting the corresponding ends of said front and rear steering bars; and a plurality of stretchers extending between and supported upon said forward and rearward frame elements, one of said stretchers being between said chassis members and adjacent to said one chassis member, whereby a worker reclining upon said one stretcher can steer said vehicle by operating said rear steering bar and can control said power unit by actuating said lever.

2. In a vehicle, having a forward end and a rearward end, for accommodating workers in the prone position, the combination comprising: a pair of spaced, parallel, substantially horizontal chassis members; a pair of driving wheels rotatably secured to the rearward ends of said chassis members; a pair of steerable wheels pivotally secured to the forward ends of said chassis members, said chassis members' forward ends being higher than the rearward ends thereof; a rectangular frame having front and rear parallel elements and means securing said chassis members adjustably thereto for movement of said chassis members transversely of their longitudinal extent, a power unit supported between said driving wheels upon said chassis members; transmission means, including a clutch, operably connecting said power unit with said driving wheels; a clutch actuating lever pivotally supported upon one chassis member and means operably connecting said lever to said clutch; a steering bar horizontally pivotally supported upon said rear element between said chassis members adjacent to said one chassis member; linkage operably connecting said steering bar to said steerable wheels; and a plurality of stretchers extending between said front and rear elements, one of said stretchers being between said chassis members and adjacent to said one chassis member, whereby a worker reclining upon said one stretcher can control the movement and direction of said vehicle by operating the steering bar and the lever.

3. In a vehicle, having forward and rearward ends, for accommodating workers in the prone position, the combination comprising: a pair of spaced, substantially horizontal and parallel longitudinal chassis members; a pair of driving wheels supporting the rearward end of said chassis members and a pair of steerable wheels supporting the forward ends of said chassis members; front and rear, spaced, parallel transverse elements secured to and perpendicular to said chassis members between said driving wheels and the point of support of said steerable wheels on said chassis members; driving wheel actuating means including a clutch mounted on said chassis members; a clutch operating lever pivotally supported upon one chassis member and means connecting said lever to said clutch; a steering bar pivotally supported upon said rear element adjacent to said one chassis member; linkage operably connecting said steering bar to said steerable wheels; and a plurality of stretchers extending between said front and rear elements, one of said stretchers being adjacent to said one chassis member and longitudinally aligned with said steering bar, whereby a worker reclining upon said one stretcher can control the movement and direction of said vehicle by operating the steering bar and the lever.

4. In a vehicle, having forward and rearward ends, for accommodating workers in the prone position, the combination comprising: a pair of spaced, longitudinal, substantially horizontal and parallel chassis members; a pair of driving wheels supporting the rearward ends of said chassis members and a pair of steerable wheels supporting the forward ends of said chassis members; front and rear, spaced, transverse parallel elements secured to and perpendicular to said chassis members; driving wheel actuating means including a clutch mounted on said chassis members; a clutch operating lever pivotally supported upon one chassis member and means operably connecting said lever and clutch; a steering bar pivotally supported upon said rear element adjacent to said one chassis member; linkage operably connecting said steering bar to said steerable wheels; and a stretcher extending between said front and rear elements adjacent to said one chassis member and longitudinally aligned with said steering bar, whereby a worker reclining upon said one stretcher can control the movement and direction of said vehicle by operating the steering bar and the lever.

ROBERT L. CHICKERING.
ALFRED M. CHICKERING.

REFERENCES CITED

The following references are of record in the file of this patent:

UNITED STATES PATENTS

| Number | Name | Date |
|---|---|---|
| 1,273,593 | Felicetti | July 23, 1918 |
| 1,631,561 | Symmes | June 7, 1927 |
| 2,261,354 | Fee | Nov. 4, 1941 |

FOREIGN PATENTS

| Number | Country | Date |
|---|---|---|
| 665,817 | Germany | Oct. 4, 1938 |